United States Patent
Iwamoto et al.

(10) Patent No.: US 12,554,951 B2
(45) Date of Patent: Feb. 17, 2026

(54) ARTICLE MANAGEMENT SYSTEM, ARTICLE MANAGEMENT METHOD, AND STORAGE MEDIUM

(71) Applicant: TOYOTA JIDOSHA KABUSHIKI KAISHA, Toyota (JP)

(72) Inventors: Kunihiro Iwamoto, Toyota (JP); Yuta Itozawa, Nagoya (JP); Hirotaka Komura, Tokyo (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 466 days.

(21) Appl. No.: 18/131,927

(22) Filed: Apr. 7, 2023

(65) Prior Publication Data
US 2024/0005111 A1  Jan. 4, 2024

(30) Foreign Application Priority Data
Jun. 29, 2022  (JP) ................ 2022-104163

(51) Int. Cl.
 *G06K 7/10* (2006.01)
 *G06K 7/14* (2006.01)

(52) U.S. Cl.
 CPC ....... *G06K 7/10366* (2013.01); *G06K 7/1413* (2013.01); *G06K 7/1417* (2013.01); *B65G 2203/0216* (2013.01)

(58) Field of Classification Search
 CPC ........... G06K 7/10366; G06K 7/1413; G06K 7/1417; B65G 2203/0216
 See application file for complete search history.

(56) References Cited

U.S. PATENT DOCUMENTS

| 8,307,061 B1* | 11/2012 | Hickman ............. B25J 9/161 709/200 |
| 11,120,394 B2* | 9/2021 | Anderson .......... G06Q 10/0836 |
| 2015/0120462 A1* | 4/2015 | Zhang ............... G06Q 30/0267 705/14.64 |
| 2016/0140645 A1* | 5/2016 | Whang ............... G06Q 20/36 705/26.8 |

(Continued)

FOREIGN PATENT DOCUMENTS

| JP | 2005-243045 A | 9/2005 |
| JP | 2016-045970 A | 4/2016 |
| JP | 2021-071884 A | 5/2021 |

OTHER PUBLICATIONS

U.S. Appl. No. 17/980,620, filed Nov. 4, 2022 in the name of Kunihiro Iwamoto et al.

*Primary Examiner* — Kyle O Logan
(74) *Attorney, Agent, or Firm* — Oliff PLC

(57) ABSTRACT

Provided is an article management system using a computer that associates and stores identification information for identifying an article to be delivered to a user and one or more pieces of usage information regarding use of the article attached by a sender of the article, and that reads the identification information attached to the article, extracts at least one piece of usage information from the one or more pieces of usage information associated with the identification information, and outputs the extracted piece of usage information to the user. When usage information to be output to the user is extracted, output usage information output to the user in the past is excluded from the one or more pieces of usage information.

7 Claims, 4 Drawing Sheets

(56) References Cited

U.S. PATENT DOCUMENTS

| | | | |
|---|---|---|---|
| 2016/0210677 A1* | 7/2016 | Oh | G06Q 30/0641 |
| 2016/0239733 A1* | 8/2016 | Hertz | H04W 4/029 |
| 2016/0275521 A1* | 9/2016 | Afshar | G06Q 30/012 |
| 2017/0206531 A1* | 7/2017 | Takahata | G06Q 30/0278 |
| 2018/0114413 A1* | 4/2018 | Tsuchimochi | G06V 20/00 |
| 2020/0010273 A1* | 1/2020 | Bellar | B65G 1/1373 |
| 2021/0326828 A1* | 10/2021 | Enatsu | G06Q 20/3276 |
| 2022/0318890 A1* | 10/2022 | Uchimura | G06Q 30/02 |
| 2023/0028398 A1* | 1/2023 | Matsuno | G06Q 20/208 |

* cited by examiner

ARTICLE MANAGEMENT SYSTEM, ARTICLE MANAGEMENT METHOD, AND STORAGE MEDIUM

CROSS-REFERENCE TO RELATED APPLICATION

This application claims priority to Japanese Patent Application No. 2022-104163 filed on Jun. 29, 2022, incorporated herein by reference in its entirety.

BACKGROUND

1. Technical Field

The present disclosure relates to an article management system, an article management method, and a storage medium.

2. Description of Related Art

Japanese Unexamined Patent Application Publication No. 2021-71884 discloses a system for automatically delivering an article using a vehicle capable of autonomous travel.

SUMMARY

When a sender of an article to be delivered sends usage information regarding the use of the article together with the article to a user, the user may feel discomfort when the usage information provided to the user in the past is provided again.

The present disclosure provides an article management system capable of reducing discomfort felt by a user when providing usage information of a delivered article.

A first aspect of the disclosure relates to an article management system using a computer that is configured to associate and store identification information for identifying an article to be delivered to a user and one or more pieces of usage information regarding use of the article attached by a sender of the article. The article management system is configured to read the identification information attached to the article, extract at least one piece of usage information from the one or more pieces of usage information associated with the identification information, and output the extracted piece of usage information to the user. When usage information to be output to the user is extracted, the article management system is configured to exclude output usage information output to the user in the past from the one or more pieces of usage information.

A second aspect of the disclosure relates to an article management method using a computer includes associating and storing identification information for identifying an article to be delivered to a user and one or more pieces of usage information regarding use of the article attached by a sender of the article. The article management method includes reading the identification information attached to the article, extracting at least one piece of usage information from the one or more pieces of usage information associated with the identification information, and outputting the extracted piece of usage information to the user. When usage information to be output to the user is extracted, the article management method includes excluding output usage information output to the user in the past from the one or more pieces of usage information.

A third aspect of the disclosure relates to a storage medium storing an article management program that causes a computer to execute a process. The process includes associating and storing identification information for identifying an article to be delivered to a user and one or more pieces of usage information regarding use of the article attached by a sender of the article, and reading the identification information attached to the article, extracting at least one piece of usage information from the one or more pieces of usage information associated with the identification information, and outputting the extracted piece of usage information to the user. When usage information to be output to the user is extracted, the article management program includes excluding output usage information output to the user in the past from the one or more pieces of usage information.

In the configuration described above, when the usage information to be output to the user is extracted, the output usage information output to the user in the past is excluded from the one or more pieces of usage information. Therefore, the output usage information that has been output to the user in the past is not provided to the user again, and thus the discomfort felt by the user when the usage information is provided can be reduced.

In the aspect, when part of the one or more pieces of usage information is the output usage information, the usage information to be output to the user is extracted, whereas when all of the one or more pieces of usage information are output usage information, it is not necessary to extract the usage information to be output to the user.

In the aspect, when the user uses the article, the indoor robot capable of removing the article stored indoors may remove the stored article and deliver it to the user, extract at least one piece of usage information from the one or more pieces of usage information associated with the identification information, and output it to the user. With such a configuration, usage information can be presented to the user when the indoor robot delivers the article to the user.

In the aspect, when the indoor robot removes the stored article, the indoor robot may read the identification information attached to the article and extract at least one piece of usage information from the one or more pieces of usage information associated with the identification information. With such a configuration, usage information can be extracted immediately when the indoor robot removes the article.

With each of the aspects, it is possible to provide an article management system capable of reducing the discomfort felt by the user when providing usage information of a delivered article.

BRIEF DESCRIPTION OF THE DRAWINGS

Features, advantages, and technical and industrial significance of exemplary embodiments of the disclosure will be described below with reference to the accompanying drawings, in which like signs denote like elements, and wherein.

DETAILED DESCRIPTION OF EMBODIMENTS

Figure 1:
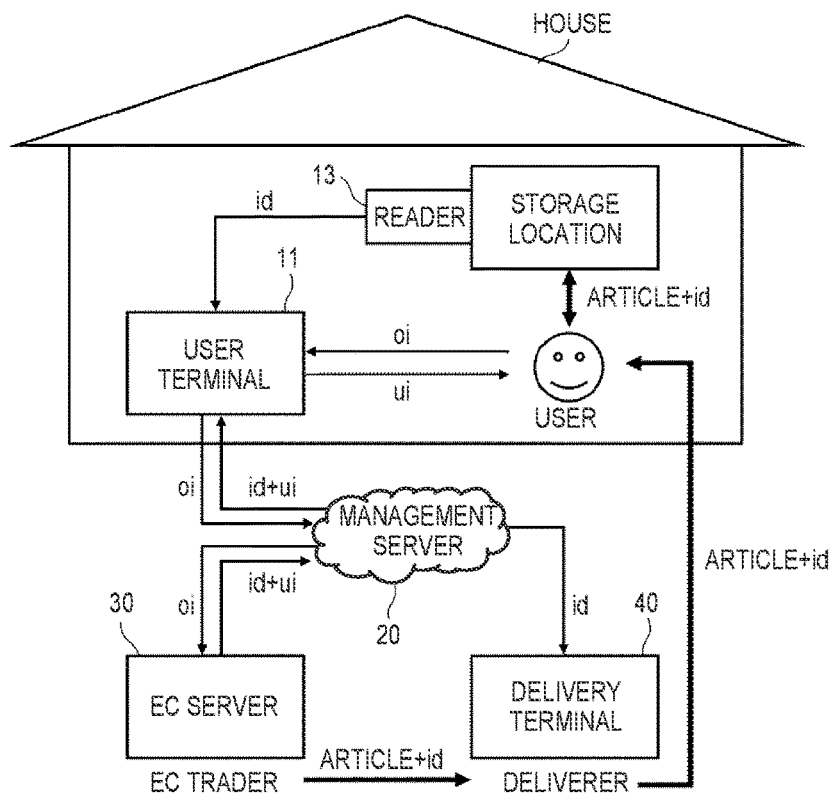
FIG. 1 is a block diagram of an article management system according to a first embodiment.

Specific embodiments are described in detail below with reference to the drawings. In each drawing, the same reference numerals and letters are given to the similar or corresponding elements, and redundant description will be omitted as necessary for clarity of description.

First Embodiment

First, an article management system and an article management method according to a first embodiment will be described with reference to FIG. 1. FIG. 1 is a block diagram of the article management system according to the first embodiment. The article management system is an article management system that uses a computer to manage a delivered article. As illustrated in FIG. 1, the article management system according to the present embodiment includes a user terminal 11, a management server 20, an electronic commerce (EC) server 30, and a delivery terminal 40.

In the present embodiment, a user purchases an article from an EC site operated by an EC trader on the Internet, and the article is delivered by a deliverer from the EC trader, who is the sender, to the user, who is the recipient.

Each of the user terminal 11, the management server 20, the EC server 30, and the delivery terminal 40 includes an arithmetic unit such as a central processing unit (CPU), and a storage unit such as a random access memory (RAM) and a read only memory (ROM) storing various control programs and data. That is, the user terminal 11, the management server 20, the EC server 30, and the delivery terminal 40 all have computer functions, and perform the following processes based on the various control programs described above.

As illustrated in FIG. 1, the user terminal 11 is a communication terminal communicatively connected to the management server 20 by wire or wirelessly. The user terminal 11 is not particularly limited as long as it can communicate with the management server 20, and is, for example, a mobile communication terminal such as a smart phone or a tablet terminal, or a personal computer (PC) installed indoors.

In FIG. 1, the user terminal 11 is located inside a living space of a house, but it may be located outdoors or outside the indoor living space. Also, in this specification, the living space includes office space.

As illustrated in FIG. 1, the user inputs order information oi to the user terminal 11. The order information oi is transmitted from the user terminal 11 to the management server 20. The order information oi is information about an article to be delivered, and examples of the order information include information such as product name, quantity, desired delivery date, and shipping address.

Also, the user terminal 11 receives article identification information id and usage information ui issued by the EC server 30 from the management server 20, and stores them in an association manner.

When the user uses the article, the user terminal 11 receives the article identification information id read by a reader 13. Then, the user terminal 11 extracts and outputs the usage information ui associated with the article identification information id.

The management server 20 is a server that manages the article management system. As illustrated in FIG. 1, the management server 20 is communicably connected to the user terminal 11, the EC server 30, and the delivery terminal 40. The management server 20 is, for example, a cloud server. The management server 20 transmits the order information oi received from the user terminal 11 to the EC server 30.

The management server 20 also receives the article identification information id and the usage information ui issued by the EC server 30 and transmits them to the user terminal 11.

The management server 20 also transmits the article identification information id to the delivery terminal 40.

The EC server 30 is, for example, a server that forms an EC site operated by the EC trader on the Internet. As illustrated in FIG. 1, the EC server 30 is communicably connected to the management server 20, issues the article identification information id and the usage information ui according to the order information oi received from the management server 20, and transmits them to the management server 20.

The article identification information id issued by the EC server 30 is information for identifying the article to be delivered, such as an order number. The article identification information id includes part or all of the order information oi.

The usage information ui issued by the EC server 30 is information relating to the use of the article sent by the sender of the article together with the article. The usage information ui is information that a user who is the recipient should refer to when using the article. The usage information ui is not particularly limited as long as it is information relating to the use of the delivered article. The examples of the usage information ui include attachments and manuals regarding the use of the article. When the delivered article is food, the examples of the usage information ui include the cooking method, the best-before date, and the expiration date of the article.

The delivery terminal 40 is, for example, a terminal carried by a deliverer, and is a communication terminal capable of reading the article identification information id attached to the article. As illustrated in FIG. 1, the delivery terminal 40 is communicably connected to the management server 20. The delivery terminal 40 receives the article identification information id from the management server 20. By using the delivery terminal 40 to read the article identification information id attached to the article, the deliverer can identify the article to be delivered.

The delivery terminal 40 may receive the usage information ui together with the article identification information id from the management server 20.

Further, the delivery terminal 40 may be a delivery robot, that is, a vehicle that can travel autonomously, and the delivery robot may deliver the article instead of the delivery person. Also, the delivery robot may have the usage information ui together with the article identification information id, and the usage information ui may be output to the user when the delivery robot delivers the article.

The examples of the article identification information id include characters, symbols, barcodes, two-dimensional codes, and radio frequency identifiers (RFIDs), and the article identification information id is attached directly or indirectly to the article to be delivered. More specifically, the article identification information id is directly attached or embedded in the article. Alternatively, the article identification information id is attached to, embedded in, or indirectly attached to a packaging material of the article. Here, the packaging material is not limited at all, but includes, for example, paper or vinyl boxes, bags, and sheets. The packaging material may be disposable or reusable like a returnable box.

Here, as illustrated in FIG. 1, the article with the article identification information id is delivered by the deliverer from the EC trader to the user.

When the delivery of the article is completed, it is not necessary for the user to receive the article as long as the article arrives at the house. For example, an article may be placed in a predetermined location such as delivery box in a house. Alternatively, a robot may receive the article, as described in more detail below.

In an example illustrated in FIG. 1, the delivered article is stored in a storage location by the user. In the example illustrated in FIG. 1, the reader 13 for reading the article identification information id is provided at the storage location. A reader 13 is communicably connected to the user terminal 11. When the delivered article is stored in the storage location, the reader 13 is used to read the article identification information id attached to the article and send it to the user terminal 11. Therefore, the user can confirm at the user terminal 11 that the article is being stored in the storage location.

Also, when the delivered article is removed from the storage location, the reader 13 is used to read the article identification information id attached to the article and send it to the user terminal 11. Then, the user terminal 11 extracts the usage information ui associated with the article identification information id and outputs it to the user.

The reader 13 may or may not be fixed to the storage location.

As described above, in the article management system according to the present embodiment, the user terminal 11 associates and stores the article identification information id that identifies the article to be delivered to the user and the usage information ui regarding the use of the article. When the user removes the article from the storage location and uses it, the reader 13 reads the article identification information id attached to the article and transmits the article identification information id from the reader 13 to the user terminal 11.

Then, the user terminal 11 extracts the usage information ui associated with the article identification information id and outputs it to the user. For example, the usage information ui is output to a monitor of the user terminal 11 as characters, images, or moving images. Alternatively, the usage information ui may be output as a voice from a speaker of the user terminal 11. Of course, the output of characters and the like from the monitor and the output of a voice from the speaker may be performed at the same time.

Here, the usage information ui includes one or more pieces of usage information, and the user terminal 11 extracts at least one piece of usage information from the usage information ui and outputs it to the user. Further, when usage information to be output to the user is extracted, the user terminal 11 excludes output usage information output to the user in the past from the usage information ui.

For example, the user terminal 11 stores output usage information output to the user in the past and excludes the output usage information from the usage information ui received from the management server 20. When the output usage information is excluded from the usage information ui, the output usage information may be deleted from the usage information ui in order to save storage capacity.

When the usage information ui includes a plurality of pieces of usage information and part of the pieces of the usage information ui is output usage information, the usage information other than the output usage information is extracted and output to the user.

In contrast, when all of the pieces of the usage information ui are output usage information, for example, usage information to be output to the user is not extracted.

As described above, in the article management system according to the present embodiment, when usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Further, in the article management system according to the present embodiment, it is possible to present information regarding the use of the delivered article to the user at the time when the user uses the article.

In the present embodiment, instead of the user terminal 11, the management server 20 may associate and store the article identification information id and the usage information ui. When the user removes the article from the storage location and uses it, for example, the user terminal 11 transmits the article identification information id received from the reader 13 to the management server 20. The management server 20 that has received the article identification information id extracts the usage information ui associated with the article identification information id and transmits it to the user terminal 11. Then, the user terminal 11 may output the usage information ui received from the management server 20 to the user.

Second Embodiment

Figure 2:
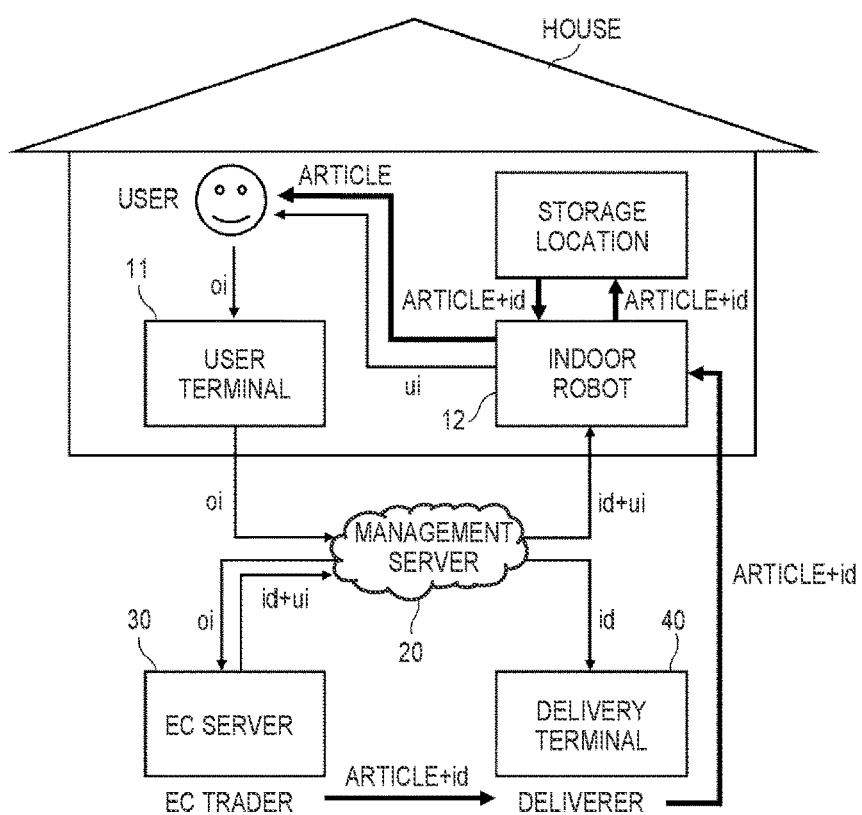
FIG. 2 is a block diagram of an article management system according to a second embodiment.

Next, an article management system and an article management method according to a second embodiment will be described with reference to FIG. 2. FIG. 2 is a block diagram of the article management system according to the second embodiment.

As illustrated in FIG. 2, the article management system according to the present embodiment includes an indoor robot 12 in addition to the user terminal 11, the management server 20, the EC server 30, and the delivery terminal 40 illustrated in FIG. 1.

In the article management system according to the first embodiment illustrated in FIG. 1, the management server 20 receives the article identification information id and usage information ui issued by the EC server 30 and transmits them to the user terminal 11. In contrast, in the article management system according to the second embodiment illustrated in FIG. 2, the management server 20 receives the article identification information id and usage information ui issued by the EC server 30 according to the order information oi, and transmits them to the indoor robot 12 instead of the user terminal 11.

The indoor robot 12 is communicably connected to the management server 20 and stores the usage information ui and article identification information id received from the management server 20 in association with each other. The indoor robot 12 also has, for example, an arithmetic unit and a storage unit storing various control programs, data, and the like, and has a function as a computer, and performs the following processes based on the above-described various control programs and the like.

Here, the indoor robot 12 is a robot that can move indoors. The indoor robot 12 has, for example, an arm for gripping an article, receives the delivered article from the deliverer, and stores the article in a predetermined storage location. Also, the indoor robot 12 removes the article stored in the storage location and delivers it to the user.

As illustrated in FIG. 2, when a user uses an article, the indoor robot 12 removes the article from the storage location and delivers the article to the user. In this case, the indoor robot 12 reads the article identification information id attached to the article, extracts the usage information ui associated with the article identification information id, and outputs it to the user. That is, the indoor robot 12 has the function of the reader 13 illustrated in FIG. 1.

Here, the usage information ui includes one or more pieces of usage information, and the indoor robot 12 extracts at least one piece of usage information from the usage information ui and outputs it to the user. Further, when usage information to be output to the user is extracted, the indoor robot 12 excludes output usage information output to the user in the past from the usage information ui.

For example, the indoor robot 12 stores output usage information output to the user in the past, and excludes the output usage information from the usage information ui received from the management server 20. When the output usage information is excluded from the usage information ui, the output usage information may be deleted from the usage information ui in order to save storage capacity.

As described above, in the article management system according to the present embodiment, when usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the present embodiment, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Since other configurations are the same as those of the first embodiment, descriptions thereof are omitted.

First Modification Example

Figure 3:
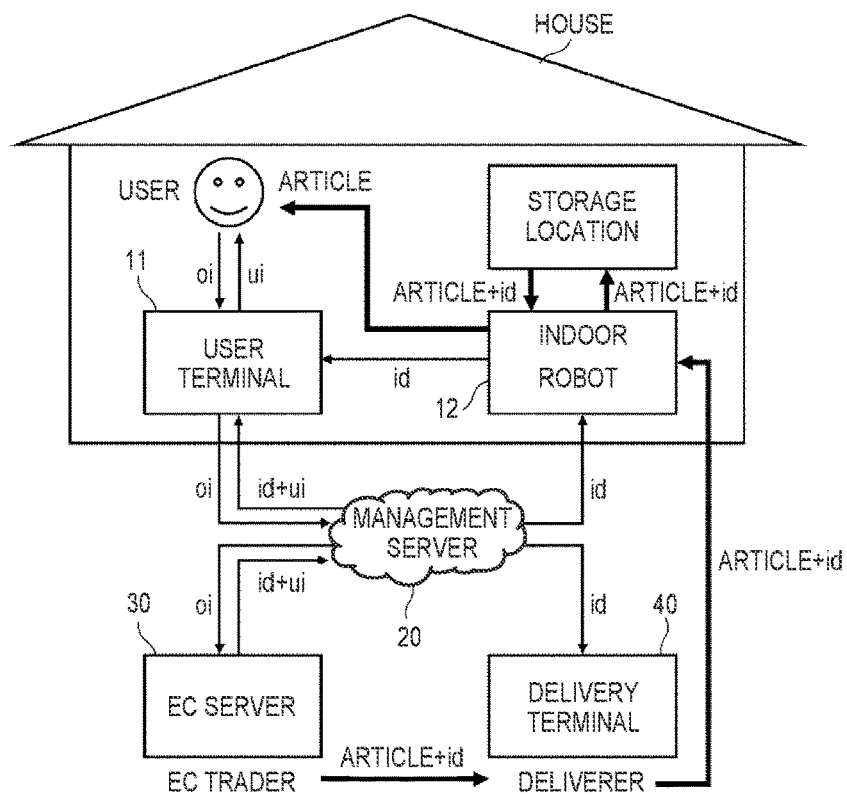
FIG. 3 is a block diagram of an article management system according to a first modification example of the second embodiment.

Next, with reference to FIG. 3, an article management system and an article management method according to a first modification example of the second embodiment will be described. FIG. 3 is a block diagram of the article management system according to the first modification example of the second embodiment.

As illustrated in FIG. 3, the article management system according to the first modification example, such as the article management system illustrated in FIG. 2, also includes the user terminal 11, the indoor robot 12, the management server 20, the EC server 30, and the delivery terminal 40.

In the article management system according to the second embodiment illustrated in FIG. 2, the management server 20 receives the article identification information id and usage information ui issued by the EC server 30 according to the order information oi and transmits them to the indoor robot 12. In contrast, in the article management system according to the first modification example illustrated in FIG. 3, the management server 20 receives the article identification information id and usage information ui issued by the EC server 30 according to the order information oi, and transmits them to the user terminal 11 instead of the indoor robot 12. The user terminal 11 associates and stores the article identification information id and usage information ui received from the management server 20. In this case, only the article identification information id is sent from the management server 20 to the indoor robot 12.

As illustrated in FIG. 3, when a user uses an article, the indoor robot 12 removes the article from the storage location and delivers the article to the user. In this case, the indoor robot 12 reads the article identification information id attached to the article and transmits the article identification information id to the user terminal 11. That is, the indoor robot 12 has the function of the reader 13 illustrated in FIG. 1. Then, the user terminal 11 extracts the usage information ui associated with the article identification information id and outputs it to the user.

Here, the usage information ui includes one or more pieces of usage information, and the user terminal 11 extracts at least one piece of usage information from the usage information ui and outputs it to the user. Further, when usage information to be output to the user is extracted, the user terminal 11 excludes the usage information output to the user in the past from the usage information ui.

In this way, in the article management system according to the first modification example as well, when the usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the first modification example, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Since other configurations are the same as those of the second embodiment illustrated in FIG. 2, description thereof is omitted.

Second Modification Example

Figure 4:
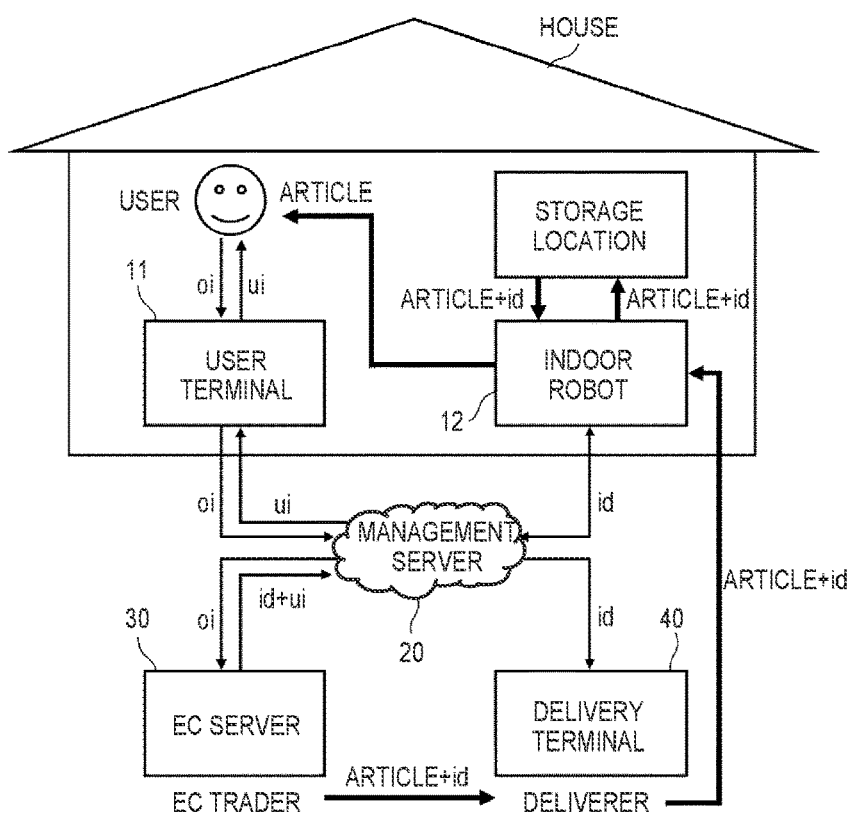
FIG. 4 is a block diagram of an article management system according to a second modification example of the second embodiment.

Next, with reference to FIG. 4, an article management system and an article management method according to a second modification example of the second embodiment will be described. FIG. 4 is a block diagram of the article management system according to the second modification example of the second embodiment.

As illustrated in FIG. 4, the article management system according to the second modification example, such as the article management system illustrated in FIG. 2, also includes the user terminal 11, the indoor robot 12, the management server 20, the EC server 30, and the delivery terminal 40.

In the article management system according to the second embodiment illustrated in FIG. 2, the management server 20 receives the article identification information id and usage information ui issued by the EC server 30 according to the order information of and transmits them to the indoor robot 12. In contrast, in the article management system according to the second modification example illustrated in FIG. 4, the management server 20 receives the article identification information id and usage information ui issued by the EC server 30 in accordance with the order information oi, and associates and stores them. Only the article identification information id is sent to the indoor robot 12 from the management server 20.

As illustrated in FIG. 4, when a user uses an article, the indoor robot 12 removes the article from the storage location and delivers the article to the user. In this case, the indoor robot 12 reads the article identification information id attached to the article and transmits the article identification information id to the management server 20. That is, the indoor robot 12 has the functions of the reader 13 illustrated in FIG. 1. The management server 20 extracts the usage information ui associated with the article identification information id and transmits it to the user terminal 11. The user terminal 11 then outputs the usage information ui received from the management server 20 to the user.

Here, the usage information ui includes one or more pieces of usage information, and the management server 20 extracts at least one piece of usage information from the usage information ui and outputs it to the user. Further, when usage information to be output to the user is extracted, the management server 20 excludes output usage information output to the user in the past from the usage information ui.

In this way, in the article management system according to the second modification example as well, when the usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the second modification example as well, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Also, in FIG. 4, the management server 20 may transmit the extracted usage information ui to the indoor robot 12 instead of the user terminal 11, and the indoor robot 12 may output the usage information ui received from the management server 20 to the user.

Since other configurations are the same as those of the second embodiment illustrated in FIG. 2, description thereof is omitted.

Third Embodiment

Figure 5:
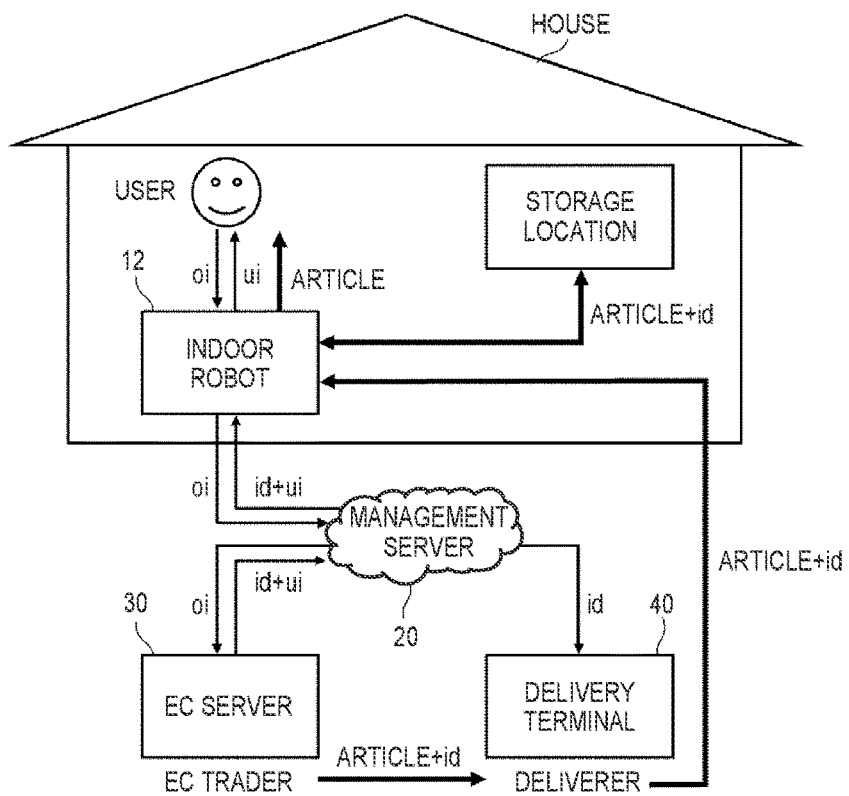
FIG. 5 is a block diagram of an article management system according to a third embodiment.

Next, an article management system and an article management method according to a third embodiment will be described with reference to FIG. 5. FIG. 5 is a block diagram of the article management system according to the third embodiment.

As illustrated in FIG. 5, the article management system according to the present embodiment includes the indoor robot 12, the management server 20, the EC server 30, and the delivery terminal 40 illustrated in FIG. 2, but does not include the user terminal 11. Here, the indoor robot 12 also functions as the user terminal 11.

As illustrated in FIG. 5, the user inputs order information oi to the indoor robot 12. The order information oi is transmitted from the indoor robot 12 to the management server 20.

As illustrated in FIG. 5, the management server 20 receives article identification information id and usage information ui issued by the EC server 30 according to the order information oi, and transmits them to the indoor robot 12. The indoor robot 12 associates and stores the usage information ui and article identification information id received from the management server 20.

As illustrated in FIG. 5, when the user uses an article, the indoor robot 12 removes the article from the storage location and delivers the article to the user. In this case, the indoor robot 12 reads the article identification information id attached to the article, extracts the usage information ui associated with the article identification information id, and outputs it to the user. That is, the indoor robot 12 has the function of the reader 13 illustrated in FIG. 1.

Here, the usage information ui includes one or more pieces of usage information, and the indoor robot 12 extracts at least one piece of usage information from the usage information ui and outputs it to the user. Further, when the indoor robot 12 extracts usage information to be output to the user, output usage information output to the user in the past is excluded from the usage information ui.

As described above, in the article management system according to the present embodiment as well, when usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the present embodiment, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Also, in the present embodiment, the article identification information id and the usage information ui may be associated and stored by the management server 20 instead of the indoor robot 12. When the user removes an article from the storage location and uses it, for example, the article identification information id read by the indoor robot 12 is sent to the management server 20. The management server 20 that has received the article identification information id extracts the usage information ui associated with the article identification information id and transmits it to the indoor robot 12. Then, the indoor robot 12 should output the usage information ui received from the management server 20 to the user.

Since other configurations are the same as those of the second embodiment illustrated in FIG. 2, description thereof is omitted.

Fourth Embodiment

Figure 6:
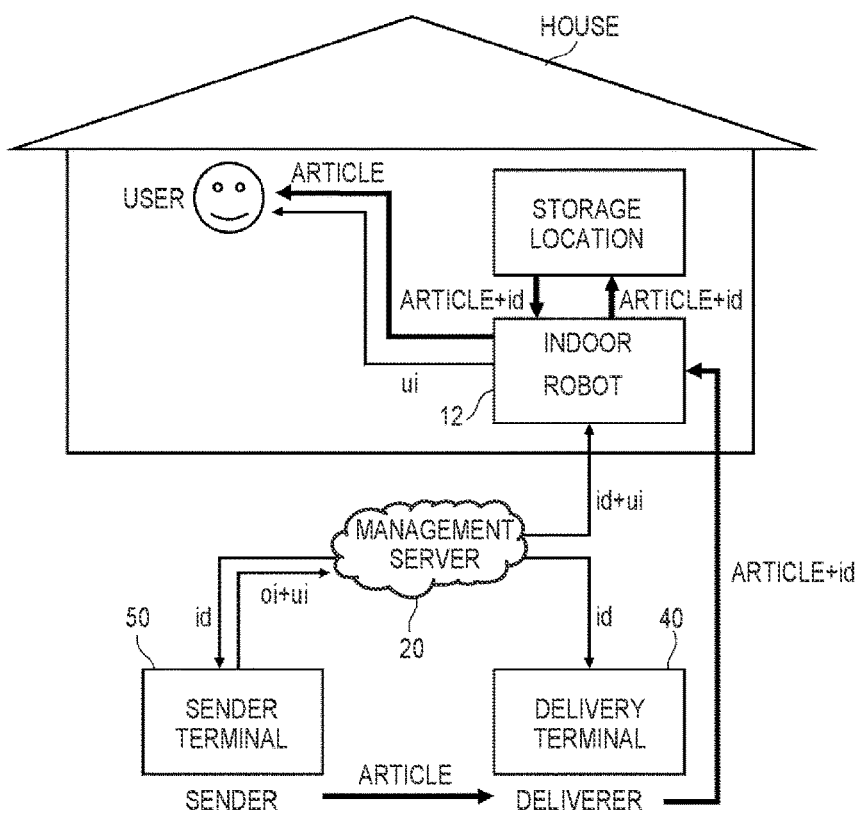
FIG. 6 is a block diagram of an article management system according to a fourth embodiment.

Next, an article management system and an article management method according to a fourth embodiment will be described with reference to FIG. 6. FIG. 6 is a block diagram of the article management system according to the fourth embodiment.

As illustrated in FIG. 6, the article management system according to the present embodiment includes a sender terminal 50 instead of the EC server 30 in addition to the indoor robot 12, the management server 20, and the delivery terminal 40 illustrated in FIG.

In the article management system according to the present embodiment, an article purchased from an EC trader is not delivered to the user, and an article (for example, a gift) from the sender is delivered to the user.

As illustrated in FIG. 6, the sender inputs order information oi and usage information ui to the sender terminal 50. The order information oi and the usage information ui are transmitted from the sender terminal 50 to the management server 20.

As illustrated in FIG. 6, the sender terminal 50 is a communication terminal communicatively connected to the management server 20 by wire or wirelessly. The sender terminal 50 is not particularly limited as long as it can communicate with the management server 20. The sender terminal 50 may be a mobile communication terminal such as a smart phone or a tablet terminal, or a personal computer (PC).

As illustrated in FIG. 6, the management server 20 issues article identification information id according to the order information oi received from the sender terminal 50 and transmits it to the sender terminal 50 and the delivery terminal 40. Further, the management server 20 sends the article identification information id and the usage information ui to the indoor robot 12. The indoor robot 12 associates and stores the usage information ui and article identification information id received from the management server 20.

As illustrated in FIG. 6, when a user uses an article, the indoor robot 12 removes the article from the storage location and delivers the article to the user. In this case, the indoor robot 12 reads the article identification information id attached to the article, extracts the usage information ui associated with the article identification information id, and outputs it to the user. That is, the indoor robot 12 has the function of the reader 13 illustrated in FIG. 1.

Here, the usage information ui includes one or more pieces of usage information, and the indoor robot 12 extracts at least one piece of usage information from the usage information ui and outputs it to the user. Further, when the indoor robot 12 extracts usage information to be output to the user, the output usage information output to the user in the past is excluded from the usage information ui.

As described above, in the article management system according to the present embodiment as well, when usage information to be output to the user is extracted, output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the present embodiment, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Also, in FIG. 6, instead of the indoor robot 12, the management server 20 may associate and store the article identification information id and the usage information ui. When the user removes an article from the storage location and uses it, for example, the article identification information id read by the indoor robot 12 is sent to the management server 20. The management server 20 that has received the article identification information id extracts the usage information ui associated with the article identification information id and transmits it to the indoor robot 12. Then, the indoor robot 12 should output the usage information ui received from the management server 20 to the user.

Further, the first embodiment and the present embodiment can be combined. In that case, instead of the indoor robot 12, the user terminal 11 may associate and store the usage information ui and article identification information id received from the management server 20.

Since other configurations are the same as those of the third embodiment illustrated in FIG. 5, description thereof is omitted.

First Modification Example

Figure 7:
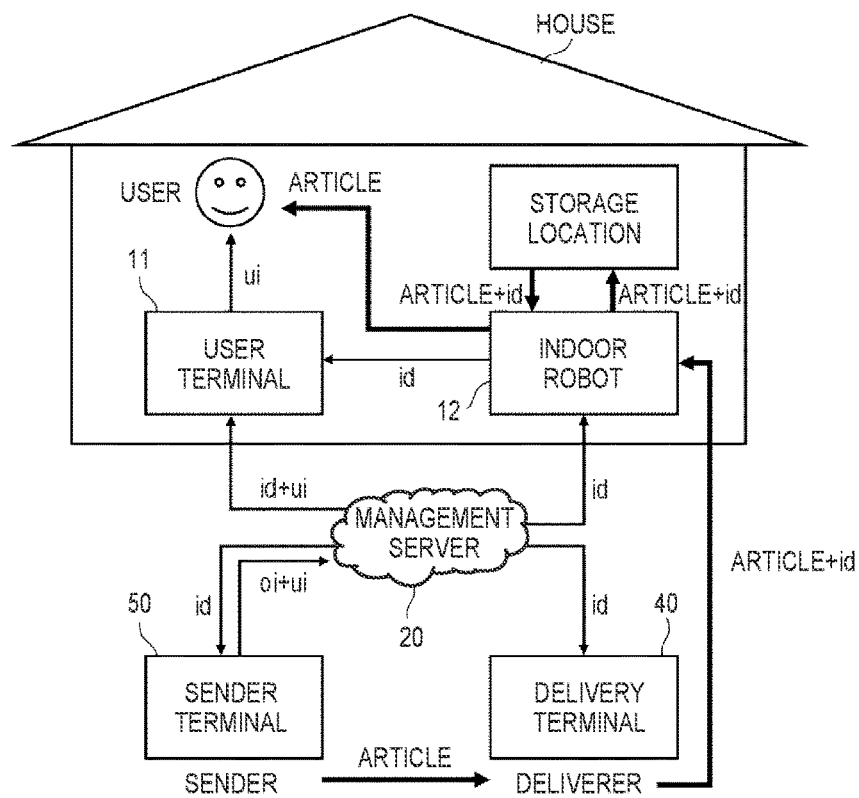
FIG. 7 is a block diagram of an article management system according to a first modification example of the fourth embodiment.

Next, with reference to FIG. 7, an article management system and an article management method according to a first modification example of the fourth embodiment will be described. FIG. 7 is a block diagram of an article management system according to the first modification example of the fourth embodiment.

As illustrated in FIG. 7, the article management system according to the first modification example also includes the user terminal 11 in addition to the indoor robot 12, the management server 20, the delivery terminal 40, and the sender terminal 50 illustrated in FIG. 6.

In the article management system according to the fourth embodiment illustrated in FIG. 6, the management server 20 transmits article identification information id and usage information ui to the indoor robot 12. In contrast, in the article management system according to the first modification example illustrated in FIG. 7, the management server 20 transmits the article identification information id and the usage information ui to the user terminal 11 instead of the indoor robot 12. The user terminal 11 associates and stores the article identification information id and usage information ui received from the management server 20. In this case, only the article identification information id is sent from the management server 20 to the indoor robot 12.

As illustrated in FIG. 7, when the user uses an article, the indoor robot 12 removes the article from the storage location and delivers the article to the user. In this case, the indoor robot 12 reads the article identification information id attached to the article and transmits the article identification information id to the user terminal 11. That is, the indoor robot 12 has the function of the reader 13 illustrated in FIG. 1. Then, the user terminal 11 extracts the usage information ui associated with the article identification information id and outputs it to the user.

Here, the usage information ui includes one or more pieces of usage information, and the user terminal 11 extracts at least one piece of usage information from the usage information ui and outputs it to the user. Further, when usage information to be output to the user is extracted, the user terminal 11 excludes output usage information output to the user in the past from the usage information ui.

In this way, in the article management system according to the first modification example as well, when the usage information to be output to the user is extracted, the output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the first modification example, it is possible to present information regarding the use of the delivered article to the user at the time when the user uses the article.

The indoor robot 12 may not have a function of a reader, and the reader 13 for reading the article identification information id may be separately provided at the storage location, as illustrated in FIG. 1, for example.

Since other configurations are the same as those of the fourth embodiment illustrated in FIG. 6, description thereof is omitted.

Second Modification Example

Figure 8:
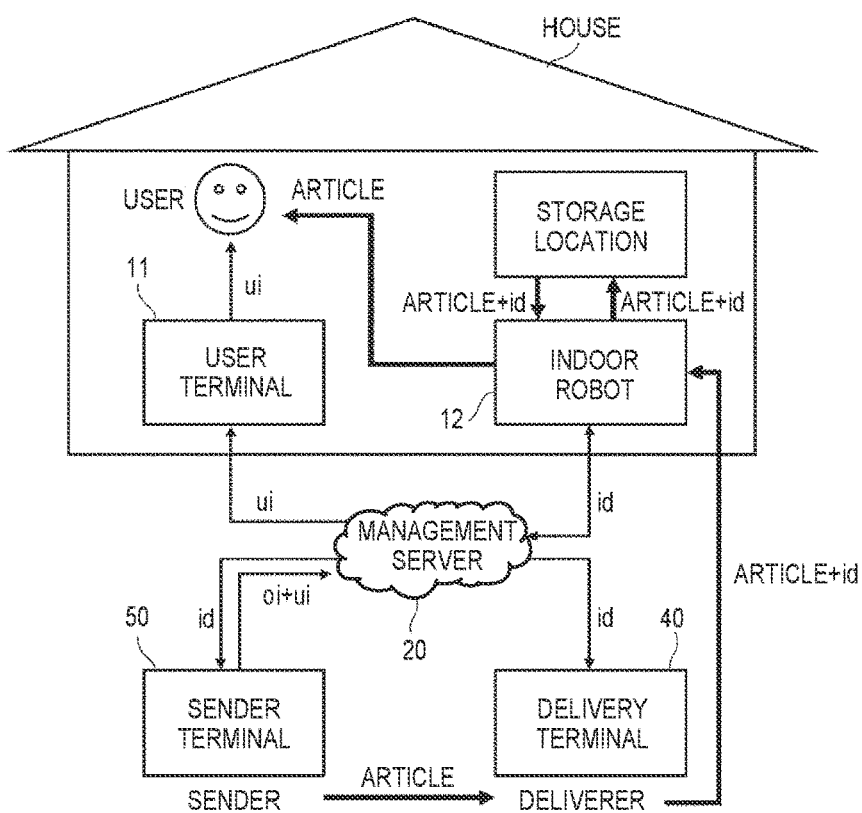
FIG. 8 is a block diagram of an article management system according to a second modification example of the fourth embodiment.

Next, with reference to FIG. 8, an article management system and an article management method according to a second modification example of a fourth embodiment will be described. FIG. 8 is a block diagram of the article management system according to the second modification example of the fourth embodiment.

As illustrated in FIG. 8, the article management system according to the second modification example also includes the user terminal 11, the indoor robot 12, the management server 20, the delivery terminal 40, and the sender terminal 50, as similar to the article management system according to the first modification example illustrated in FIG. 7.

In the article management system according to the fourth embodiment illustrated in FIG. 6, the management server 20 transmits article identification information id and usage information ui to the indoor robot 12. In contrast, in the article management system according to the second modification example illustrated in FIG. 8, the management server 20 associates and stores the article identification information id and the usage information ui. Only the article identification information id is sent to the indoor robot 12 from the management server 20.

As illustrated in FIG. 8, when the user uses an article, the indoor robot 12 removes the article from the storage location and delivers the article to the user. In this case, the indoor robot 12 reads the article identification information id attached to the article and transmits the article identification information id to the management server 20. That is, the indoor robot 12 has the function of the reader 13 illustrated in FIG. 1. The management server 20 extracts the usage information ui associated with the article identification information id and transmits it to the user terminal 11. Then, the user terminal 11 outputs the usage information ui received from the management server 20 to the user.

Here, the usage information ui includes one or more pieces of usage information, and the management server 20 extracts at least one piece of usage information from the usage information ui and outputs it to the user. Further, when usage information to be output to the user is extracted, the management server 20 excludes output usage information output to the user in the past from the usage information ui.

In this way, in the article management system according to the second modification example as well, when the usage information to be output to the user is extracted, the output usage information output to the user in the past is excluded from the usage information ui. Therefore, the output usage information that has been output to the user in the past is not provided to the user again, and thus the discomfort felt by the user when the usage information is provided can be reduced.

Also, in the article management system according to the second modification example, it is possible to present information regarding the use of the delivered article to the user at the time when the user uses the article.

The indoor robot 12 may not have a function of a reader, and the reader 13 for reading the article identification information id may be separately provided at the storage location, as shown in FIG. 1, for example.

Since other configurations are the same as those of the fourth embodiment illustrated in FIG. 6, description thereof is omitted.

In the examples described above, the program includes instructions (or software codes) that, when read by a computer, cause the computer to perform one or more of the functions described in the embodiments. The program may be stored in a non-transitory computer-readable medium or a tangible storage medium. By way of example, and not limitation, the computer readable medium or tangible storage medium may include a random-access memory (RAM), a read-only memory (ROM), a flash memory, a solid-state drive (SSD) or other memory technology, a CD-ROM, a digital versatile disc (DVD), a Blu-ray (registered trademark) disc or other optical disc storage, and a magnetic cassette, a magnetic tape, a magnetic disk storage or other magnetic storage devices. The program may be transmitted on a transitory computer-readable medium or communication medium. By way of example, and not limitation, the transitory computer readable media or communication media include electrical, optical, acoustic, or other forms of propagated signals.

The present disclosure is not limited to the embodiments described above, and can be modified as appropriate without departing from the scope of the disclosure.

What is claimed is:

1. An article management system comprising a computer configured to:
   associate and store in memory (i) identification information identifying an article to be delivered to a user and (ii) one or more pieces of usage information regarding use of the article provided by a sender of the article;
   receive the identification information identifying the article to be delivered to the user, the identification information having been read from the article by a reader configured to read one of (a) characters, (b) symbols, (c) barcodes, (d) two-dimensional codes, and (e) radio frequency identifiers (RFIDs);
   extract from the memory at least one piece of usage information from the one or more pieces of usage information associated with the identification information that has been read by the reader from the article; and
   output the extracted at least one piece of usage information to the user,
   wherein when the at least one piece of usage information to be output to the user is extracted, the computer excludes output usage information that was output to the user in the past from the one or more pieces of usage information.

2. The article management system according to claim 1, wherein the computer is configured to:
   extract from the memory the at least one piece of usage information to be output to the user when only part of the one or more pieces of usage information is the output usage information that was output to the user in the past; and
   not extract any of the usage information to be output to the user when all of the one or more pieces of usage information are the output usage information that was output to the user in the past.

3. The article management system according to claim 1, further comprising an indoor robot configured to:
   remove the article stored indoors at a location of the user and deliver the article to the user;
   extract the at least one piece of usage information from the one or more pieces of usage information associated with the identification information that has been read by the reader from the article; and
   output the extracted at least one piece of usage information to the user.

4. The article management system according to claim 3, wherein the indoor robot includes the reader.

5. The article management system according to claim 1, wherein the computer is part of a user terminal located at a location of the user.

6. The article management system according to claim 1, wherein the computer is part of a management server located remotely from a location of the user.

7. The article management system according to claim 1, wherein the computer is part of an indoor robot located at a location of the user.

* * * * *